(12) United States Patent
Park

(10) Patent No.: US 11,293,555 B2
(45) Date of Patent: Apr. 5, 2022

(54) SOLENOID VALVE

(71) Applicants: HYUNDAI MOTOR COMPANY, Seoul (KR); KIA MOTORS CORPORATION, Seoul (KR)

(72) Inventor: In Tae Park, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/091,390

(22) Filed: Nov. 6, 2020

(65) Prior Publication Data

US 2021/0356047 A1   Nov. 18, 2021

(30) Foreign Application Priority Data

May 18, 2020   (KR) .......................... 10-2020-0059398

(51) Int. Cl.
*F16K 1/44* (2006.01)
*F16K 31/06* (2006.01)

(52) U.S. Cl.
CPC .......... *F16K 1/443* (2013.01); *F16K 31/0655* (2013.01)

(58) Field of Classification Search
CPC ............................ F16K 1/443; F16K 31/0655
See application file for complete search history.

(56) References Cited

U.S. PATENT DOCUMENTS

| 4,951,468 | A | * | 8/1990 | Sasajima | ............... | F16H 61/425 |
| | | | | | | 251/129.05 |
| 6,047,718 | A | * | 4/2000 | Konsky | ................... | F16K 1/443 |
| | | | | | | 137/1 |
| 9,599,232 | B2 | | 3/2017 | Yoshimura | | |

FOREIGN PATENT DOCUMENTS

| KR | 10-0286581 B1 | 5/2002 |
| KR | 10-1223342 B1 | 1/2013 |

* cited by examiner

*Primary Examiner* — Eric Keasel
(74) *Attorney, Agent, or Firm* — Morgan, Lewis & Bockius LLP

(57) ABSTRACT

A solenoid valve including: a valve housing; a solenoid; a first plunger configured to be selectively moved rectilinearly by the solenoid; a first valve member connected to the first plunger and configured to selectively open or close a first outlet flow path in accordance with the movement of the first plunger; a first spring member configured to provide elastic force to move the first valve member to close the first outlet flow path; a second plunger provided to be rectilinearly movable in the first plunger and configured to be selectively moved rectilinearly by the solenoid; a second valve member connected to the second plunger and configured to selectively open or close a second outlet flow path in accordance with the movement of the second plunger; and a second spring member configured to provide elastic force to move the second valve member to close the second outlet flow path.

11 Claims, 6 Drawing Sheets

SOLENOID VALVE

CROSS-REFERENCE TO RELATED APPLICATION

This application claims priority to and the benefit of Korean Patent Application No. 10-2020-0059398 filed in the Korean Intellectual Property Office on May 18, 2020, the entire contents of which are incorporated herein by reference.

TECHNICAL FIELD

The present disclosure relates to a solenoid valve, and more particularly, to a solenoid valve having ensured sealability and a simplified structure.

BACKGROUND

A solenoid valve may be used to regulate a flow of a fluid or control a pressure (flow rate) and the like.

For example, the solenoid valve may be installed in a power train including an engine of a vehicle and serve to regulate a flow of a fluid such as fuel or oil or control a pressure. More specifically, a solenoid valve mounted in a fuel system may control an operation of supplying and injecting fuel, a solenoid valve mounted in a cooling system may control circulation for lubrication and cooling, and a solenoid valve mounted in a power transmission system may serve to control a pressure and a flow rate.

Meanwhile, if sealing performance of the solenoid valve is not ensured, there may be problems in that it is difficult to accurately regulate (turn on/off) the flow of the fluid, and accuracy in controlling the flow rate deteriorates, and a safety accident may occur. Therefore, sealability of the solenoid valve needs to be ensured.

For example, if hydrogen leaks from the solenoid valve mounted in a hydrogen supply line required to have high sealability, there may be safety problems such as damage to components, explosion, fires, and the like. Therefore, the sealability of the solenoid valve needs to be ensured.

However, in the related art, because a shut-off solenoid valve for regulating a flow of a fluid and a flow rate control solenoid valve for controlling a flow rate of the fluid need to be separately and independently provided in order to ensure stability and sealability of the solenoid valve, there are problems in that the structure becomes complicated, spatial utilization and a degree of design freedom deteriorate, and a cost and a weight are increased.

To this end, recently, various types of research are conducted to ensure sealability of the solenoid valve and simplify the structure of the solenoid valve, but the research result is still insufficient. Accordingly, there is a need for development of a solenoid valve having ensured sealability and a simplified structure.

SUMMARY OF THE INVENTION

An object of the present disclosure is to provide a solenoid valve having ensured sealability and a simplified structure.

Another object of the present disclosure is to implement a double shut-off structure by using a single solenoid.

Still another object of the present disclosure is to improve spatial utilization and a degree of design freedom and reduce a cost and a weight.

Yet another object of the present disclosure is to improve stability and reliability.

Still yet another object of the present disclosure is to improve accuracy of proportional control.

The object to be achieved by the exemplary embodiment is not limited to the above-mentioned objects, but also includes objects or effects that may be recognized from the solutions or the exemplary embodiments described below.

In order to achieve the above-mentioned objects of the present disclosure, an exemplary embodiment of the present disclosure provides a solenoid valve including: a valve housing; a solenoid provided at one side of the valve housing; a first plunger configured to be selectively moved rectilinearly by the solenoid; a first valve member connected to the first plunger and configured to selectively open or close a first outlet flow path in the valve housing in accordance with the movement of the first plunger; a first spring member configured to provide elastic force to move the first valve member in a direction in which the first valve member closes the first outlet flow path; a second plunger provided to be rectilinearly movable in the first plunger and configured to be selectively moved rectilinearly by the solenoid; a second valve member connected to the second plunger and configured to selectively open or close a second outlet flow path in the valve housing in accordance with the movement of the second plunger, the second outlet flow path being connected to a downstream side of the first outlet flow path; and a second spring member configured to provide elastic force to move the second valve member in a direction in which the second valve member closes the second outlet flow path.

This is to ensure sealability of the solenoid valve and simplify the structure.

That is, it is possible to control a flow rate while regulating (turning on/off) a flow of a fluid by using the solenoid valve (the flow rate control valve), but there is a problem in that it is difficult to maintain high sealability by using the solenoid valve that performs both the two functions (the function of regulating the flow of the fluid and the function of controlling the flow rate) (particularly, when overpressure occurs).

Further, when the flow is stuck due to a component defect of the solenoid valve (the flow rate control valve) or external foreign substances or when the fluid leaks from a sealing surface, there is a risk of these events directly leading to a safety accident.

Therefore, in a system or facility (e.g., a hydrogen supply line) that requires high stability and sealability, a shut-off solenoid valve for regulating the flow of the fluid and a flow rate control solenoid valve for controlling the flow rate of the fluid are separately and independently mounted. As described above, in the related art, since the shut-off solenoid valve for regulating the flow of the fluid and the flow rate control solenoid valve for controlling the flow rate of the fluid need to be separately and independently provided in the system or facility that requires high stability and sealability, there are problems in that the structure becomes complicated, spatial utilization and a degree of design freedom deteriorate, and costs are increased.

However, according to the exemplary embodiment of the present disclosure, a double shut-off sealing structure is formed by using the first plunger and the second plunger that operate independently, and as a result, it is possible to obtain an advantageous effect of ensuring high sealability and improving stability and reliability.

Above all, according to the exemplary embodiment of the present disclosure, the double shut-off structure is formed as the first plunger and the second plunger are independently operated by using the single solenoid, and as a result, it is possible to obtain an advantageous effect of ensuring high sealability, simplifying the structure, and improving spatial utilization and a degree of design freedom.

Furthermore, it is possible to reduce the number of components to be controlled, thereby obtaining an effect of reducing costs for a controller and wiring.

In addition, according to the exemplary embodiment of the present disclosure, the first plunger and the second plunger may be independently operated, and as a result, it is possible to obtain an advantageous effect of maintaining sealability even though any one of the first plunger and the second plunger is abnormal (broken down).

The timings of moving the first plunger and the second plunger by the solenoid may be variously changed in accordance with required conditions and design specifications.

According to the exemplary embodiment of the present disclosure, the first plunger and the second plunger may be configured to sequentially open or close the first outlet flow path and the second outlet flow path based on a duty rate of the solenoid.

In particular, the first valve member may close the first outlet flow path and the second valve member may close the second outlet flow path when the duty rate of the solenoid is within a first range, the first valve member may open the first outlet flow path and the second valve member may close the second outlet flow path when the duty rate of the solenoid is within a second range larger than the first range, and the second valve member may open the second outlet flow path in a state in which the first valve member opens the first outlet flow path when the duty rate of the solenoid is within a third range larger than the second range.

In particular, according to the exemplary embodiment of the present disclosure, the first outlet flow path may be configured to have a first cross-sectional area, the second outlet flow path may be configured to have a second cross-sectional area smaller than the first cross-sectional area, and a movement stroke of the first plunger may be defined to be smaller than a movement stroke of the second plunger.

This configuration is derived from the fact that when the cross-sectional area (the first cross-sectional area) of the first outlet flow path is larger than the cross-sectional area (the second cross-sectional area) of the second outlet flow path, the flow rate of the fluid flowing along the first outlet flow path may be equal (or similar) to the flow rate of the fluid flowing along the second outlet flow path even though the movement stroke of the first plunger is not increased. Therefore, it is possible to implement the configuration in which the movement stroke of the first plunger is smaller than the movement stroke of the second plunger, and the first plunger may be operated even though the duty rate of the solenoid is relatively small (the duty rate is within the second range smaller than the third range).

The solenoid may have various structures capable of providing driving power for operating the plunger.

According to the exemplary embodiment of the present disclosure, the solenoid may include: a bobbin around which a coil is wound; and a yoke provided in the bobbin so that one end of the first plunger is partially received in the yoke so as to be rectilinearly movable, and the second plunger may be selectively moved rectilinearly in the first plunger by a magnetic field applied to the yoke and the first plunger.

In particular, the second plunger may be coaxially disposed in the first plunger.

According to the exemplary embodiment of the present disclosure, the second spring member may be interposed between an inner side at one end of the first plunger and an outer side at one end of the second plunger. Since the second spring member is disposed between the inner surface at the upper end of the first plunger and the outer surface at the upper end of the second plunger as described above, it is possible to obtain an advantageous effect of simplifying the structure configured to support the second spring member and improving spatial utilization.

According to the exemplary embodiment of the present disclosure, a guide member may be provided in the bobbin so as to guide the upward and downward movements of the first plunger.

Since the guide member is provided in the bobbin as described above, it is possible to obtain an advantageous effect of minimizing the leftward and rightward movements and the deviation of the first plunger when the first plunger rectilinearly moves, and improving driving stability of the first plunger.

According to the exemplary embodiment of the present disclosure, the first spring member may be interposed between the first valve member and the guide member while surrounding the first plunger. Since the first spring member is disposed between the first valve member and the guide member as described above, it is possible to obtain an advantageous effect of simplifying the structure configured to support the first spring member and improving spatial utilization.

According to the exemplary embodiment of the present disclosure, the first valve member may be provided with a first sealing member configured to elastically come into contact with the first outlet flow path. Since the first sealing member is provided at the lower end of the first valve member as described above, it is possible to obtain an advantageous effect of improving sealability implemented by the first valve member.

According to the exemplary embodiment of the present disclosure, the second valve member may be provided with a second sealing member configured to elastically come into contact with the second outlet flow path. Since the second sealing member is provided at the lower end of the second valve member as described above, it is possible to obtain an advantageous effect of improving sealability implemented by the second valve member.

According to the exemplary embodiment of the present disclosure, the yoke may have a first inclined recess, the first plunger may have a second inclined recess having a gradient corresponding to a gradient of the first inclined recess, and when the first plunger moves so that the first valve member opens the first outlet flow path, the first inclined recess and the second inclined recess may be configured to form a straight line.

When the first plunger moves so that the first valve member opens the first outlet flow path (when the first plunger moves upward to be in close contact with the yoke) in the state in which the first inclined recess and the second inclined recess are formed in the yoke and the first plunger as described above, the first inclined recess and the second inclined recess are configured to form a straight line (disposed on the same plane), and as a result, it is possible to obtain an advantageous effect of further improving accuracy of proportional control of the second plunger.

The solenoid may be an only solenoid in the solenoid valve.

DETAILED DESCRIPTION

Figure 1:
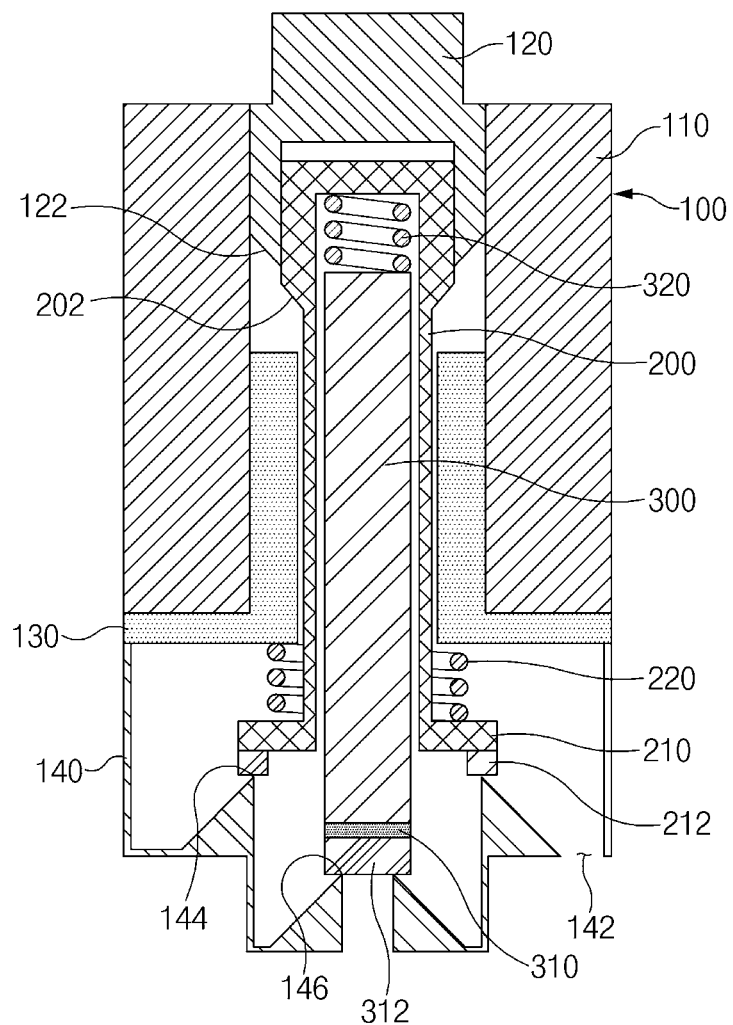
FIG. 1 is a view for explaining a solenoid valve according to an exemplary embodiment of the present disclosure.
Figure 2:
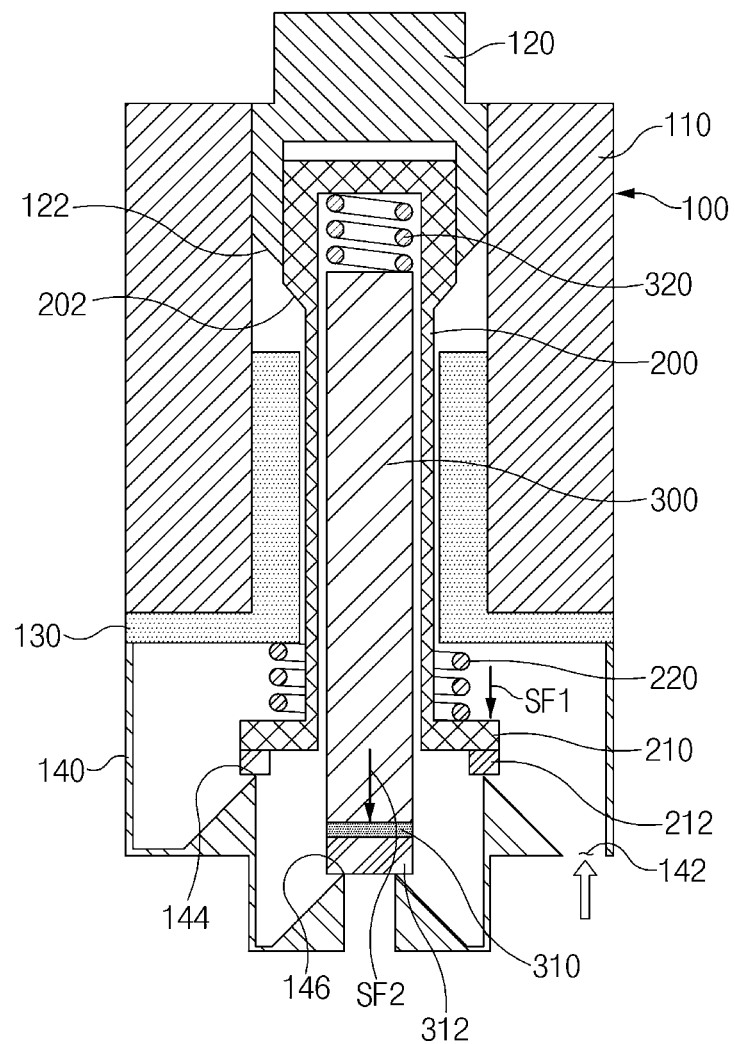
FIG. 2 is a view for explaining a state in which a first outlet flow path and a second outlet flow path are blocked in the solenoid valve according to the exemplary embodiment of the present disclosure.

Hereinafter, exemplary embodiments of the present disclosure will be described in detail with reference to the accompanying drawings.

However, the technical spirit of the present disclosure is not limited to some exemplary embodiments described herein but may be implemented in various different forms. One or more of the constituent elements in the exemplary embodiments may be selectively combined and substituted within the scope of the technical spirit of the present disclosure.

In addition, unless otherwise specifically and explicitly defined and stated, the terms (including technical and scientific terms) used in the exemplary embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the exemplary embodiment of the present disclosure are for explaining the exemplary embodiments, not for limiting the present disclosure.

Unless particularly stated otherwise in the context of the present specification, a singular form may also include a plural form. The explanation "at least one (or one or more) of A, B, and C" described herein may include one or more of all combinations that can be made by combining A, B, and C.

In addition, the terms such as first, second, A, B, (a), and (b) may be used to describe constituent elements of the exemplary embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element can be connected, coupled, or attached directly to another constituent element or connected, coupled, or attached to another constituent element through still another constituent element interposed therebetween.

In addition, the explanation "one constituent element is formed or disposed above (on) or below (under) another constituent element" includes not only a case in which the two constituent elements are in direct contact with each other, but also a case in which one or more additional constituent elements are formed or disposed between the two constituent elements. In addition, the expression "up (above) or down (below)" may include a meaning of a downward direction as well as an upward direction based on one constituent element.

Referring to FIGS. 1 to 6, a solenoid valve 10 according to an exemplary embodiment of the present disclosure includes a valve housing 140, a solenoid 100 provided at one side of the valve housing 140, a first plunger 200 configured to be selectively moved rectilinearly by the solenoid 100, a first valve member 210 connected to the first plunger 200 and configured to selectively open or close a first outlet flow path 144 in the valve housing 140 in accordance with the movement of the first plunger 200, a first spring member 220 configured to provide elastic force so that the first valve member 210 moves in a direction in which the first valve member 210 closes the first outlet flow path 144, a second plunger 300 provided to be rectilinearly movable in the first plunger 200 and configured to be selectively moved rectilinearly by the solenoid 100, a second valve member 310 connected to the second plunger 300 and configured to selectively open or close a second outlet flow path 146 in the valve housing 140 in accordance with the movement of the second plunger 300, and a second spring member 320 configured to provide elastic force so that the second valve member 310 moves in a direction in which the second valve member 310 closes the second outlet flow path 146. The second outlet flow path 146 may be configured to be connected to a downstream side of the first outlet flow path 144.

For reference, the solenoid valve 10 according to the exemplary embodiment of the present disclosure may be mounted in various types of systems or facilities in order to regulate a flow of a fluid or control a flow rate or a pressure, and the present disclosure is not restricted or limited by the types of systems or facilities in which the solenoid valve 10 is mounted.

For example, the solenoid valve 10 according to the exemplary embodiment of the present disclosure may be installed in a power train including an engine of a vehicle and may serve to regulate a flow of a fluid such as fuel or oil or control a flow rate. More specifically, the solenoid valve 10 may be mounted in a fuel system to control an operation of supplying and injecting fuel, mounted in a cooling system to control circulation for lubrication and cooling, or mounted in a power transmission system to control a pressure.

The valve housing 140 may have various structures having a predetermined space therein and including an inlet flow path 142, the first outlet flow path 144, and the second outlet flow path 146, and the present disclosure is not restricted or limited by the structure and the shape of the valve housing 140.

For example, based on FIG. 1, the inlet flow path 142 into which the fluid is supplied (introduced) may be formed at a right lower end of the valve housing 140, the first outlet flow path 144 may be formed at an inner side of a central portion of the valve housing 140, the second outlet flow path 146 may be formed at a lower end of the central portion of the valve housing 140 so as to be connected to the downstream side of the first outlet flow path 144, and the fluid, which is introduced into the valve housing 140 through the inlet flow path 142, may sequentially flow through the first outlet flow path 144 and the second outlet flow path 146 and then be discharged to the outside of the valve housing 140.

In particular, the first outlet flow path 144 may be formed in the form of a ring having a first cross-sectional area (e.g., a first diameter), and the second outlet flow path 146 may be formed in the form of a ring having a second cross-sectional area (e.g., a second diameter) smaller than the first cross-sectional area and disposed in the first outlet flow path 144. More particularly, the second outlet flow path 146 may be disposed in the first outlet flow path 144 so as to be coaxial with the first outlet flow path 144.

According to another exemplary embodiment of the present disclosure, the inlet flow path, the first outlet flow path, and the second outlet flow path may be formed at other positions in the valve housing, and the present disclosure is not restricted or limited by the positions and the arrangement structures of the respective flow paths (the inlet flow path, the first outlet flow path, and the second outlet flow path). In some instances, the second outlet flow path may be non-coaxially disposed in the first outlet flow path.

The solenoid 100 is provided at one side (e.g., an upper side) of the valve housing 140 in order to provide driving power for operating (e.g., moving upward or downward) the first plunger 200 and the second plunger 300.

The solenoid 100 may have various structures capable of providing driving power for operating the first plunger 200 and the second plunger 300, and the present disclosure is not restricted or limited by the type and the structure of the solenoid 100.

For example, the solenoid 100 includes a bobbin 110 around which a coil is wound, and a yoke 120 provided in the bobbin 110 such that one end of the first plunger 200 is partially received in the yoke 120 so as to be rectilinearly movable.

For example, the bobbin 110 may be formed in a hollow cylindrical shape that surrounds the first plunger 200, and the bobbin 110 is disposed at the upper side of the valve housing 140.

The coil (not illustrated) may be wound around the bobbin 110, and power may be applied to the coil from a power supply unit (not illustrated).

The yoke 120 is disposed at an upper side of the bobbin 110 so as to cover a part of an inner circumferential surface of the bobbin 110, and one end (an upper end based on FIG. 1) of the first plunger 200 is partially received in the yoke 120 so as to be rectilinearly movable.

More specifically, the yoke 120 may have a smaller length (a length in an up-down direction based on FIG. 1) than the bobbin 110 and may be formed in an approximately 'U'-shaped cross-sectional shape (e.g., in the form of a hollow cup). The yoke 120 is disposed in the bobbin 110 so that an opening (not illustrated) of the yoke 120 is directed downward (e.g., toward the second outlet flow path).

The yoke 120 may be made of typical cast iron, and the material and the property of the yoke 120 may be variously changed in accordance with required conditions and design specifications.

The first plunger 200 is provided in the bobbin 110 so as to be selectively moved rectilinearly by the solenoid 100.

The first plunger 200 may have various structures in accordance with required conditions and design specifications. For example, the first plunger 200 may have a hollow structure closed at an upper end thereof and opened at a lower end thereof.

More specifically, the first plunger 200 is configured to be selectively moved rectilinearly in the up-down direction in the bobbin 110 in the state in which the upper end of the first plunger 200 is partially received in the yoke 120.

For reference, the movement (stroke) of the first plunger 200 relative to the bobbin 110 may be controlled by adjusting (e.g., turning on/off) power to be applied to the coil, and the movement of the first plunger 200 is controlled to allow the first valve member 210 to open or close the first outlet flow path 144, thereby selectively shutting off (regulating) the flow of the fluid.

The first valve member 210 is connected to a lower end of the first plunger 200 and configured to open or close the first outlet flow path 144 in accordance with the movement of the first plunger 200.

For example, the first valve member 210 may be integrally connected to the lower end of the first plunger 200. When the first plunger 200 moves upward, the first valve member 210 moves upward together with the first plunger 200, such that the first outlet flow path 144 may be opened. In contrast, when the first plunger 200 moves downward, the first valve member 210 moves downward together with the first plunger 200, such that the first outlet flow path 144 may be blocked (closed).

The first valve member 210 may have various structures capable of opening or closing the first outlet flow path 144, and the present disclosure is not restricted or limited by the structure and the shape of the first valve member 210.

In particular, a first sealing member 212 (made of rubber or silicone, for example) is provided at a lower end of the first valve member 210 and configured to elastically come into close contact with the first outlet flow path 144. Since the first sealing member 212 is provided at the lower end of the first valve member 210 as described above, it is possible to obtain an advantageous effect of improving sealability implemented by the first valve member 210. When the first valve member 210 moves downward together with the first plunger 200 to be in contact with the first sealing member 212, the first outlet flow path 144 may be blocked (closed).

The first spring member 220 is provided to provide elastic force (SF1 in FIG. 2) so that the first valve member 210 moves in the direction in which the first valve member 210 closes the first outlet flow path 144.

For example, a typical spring (e.g., a coil spring) capable of elastically supporting the movement of the first valve member 210 may be used as the first spring member 220, and the present disclosure is not restricted or limited by the type and the structure of the first spring member 220.

In particular, the first spring member 220 may surround the first plunger 200 and may be disposed between the first valve member 210 and the bobbin 110 (a guide member) so as to be elastically compressed and restored. Since the first spring member 220 is disposed between the first valve member 210 and the bobbin 110 (the guide member) as described above, it is possible to obtain an advantageous effect of simplifying the structure configured to support the first spring member 220 and improving spatial utilization. In some instances, a separate support portion for supporting the first spring member 220 may be formed on an inner wall of the valve housing 140.

The second plunger 300 is provided to be rectilinearly movable in the first plunger 200 and configured to be selectively moved rectilinearly by the solenoid 100.

The second plunger 300 may have various structures capable of being received in the first plunger 200 so as to be rectilinearly movable, and the present disclosure is not restricted or limited by the structure and the shape of the second plunger 300. For example, the second plunger 300 may be formed in the form of a rod having a circular cross section.

In particular, the second plunger 300 is coaxially disposed in the first plunger 200.

More specifically, the second plunger 300 is configured to be selectively moved rectilinearly in the up-down direction in the first plunger 200 in the state in which an upper end of the second plunger 300 is disposed in the first plunger 200 so as to be partially received in the yoke 120 or adjacent to the yoke 120.

Figure 3:
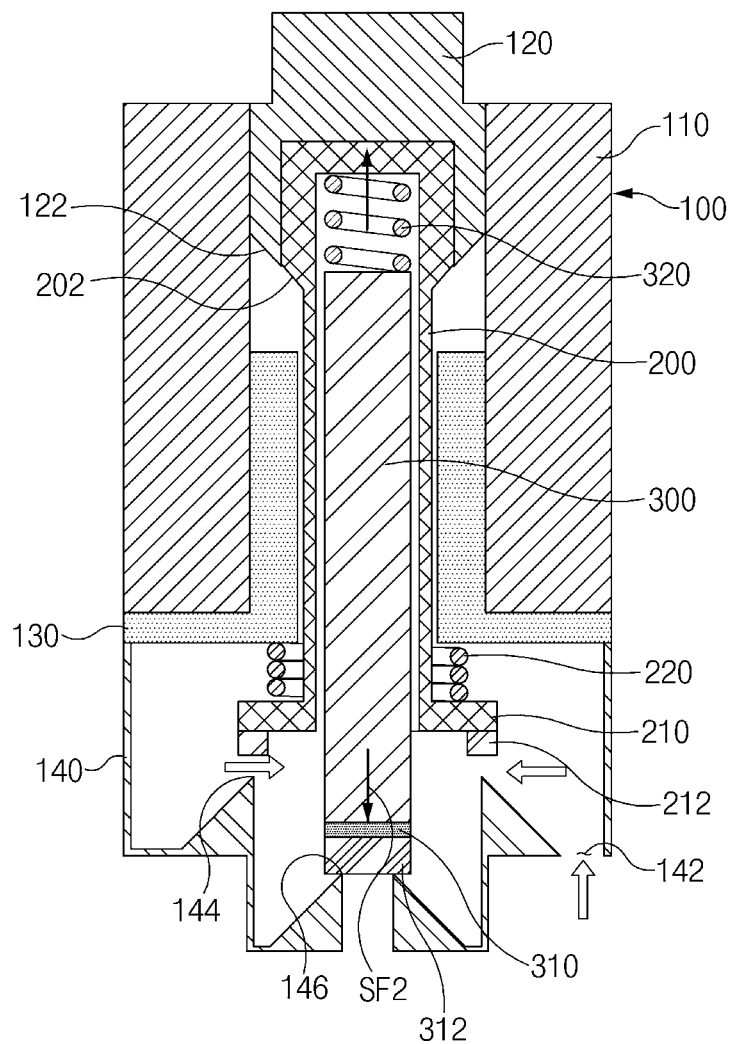
FIGS. 3 and 4 are views for explaining a structure for operating a first plunger and a second plunger in the solenoid valve according to the exemplary embodiment of the present disclosure.

In particular, the second plunger 300 is configured to be selectively moved rectilinearly in the first plunger 200 by a magnetic field applied to the yoke 120 and the first plunger 200 in a state in which the first plunger 200 is moved upward to be in close contact with the yoke 120 (see FIG. 3).

For reference, the movement (stroke) of the second plunger 300 relative to the bobbin 110 may be controlled by adjusting power to be applied to the coil, and the movement of the second plunger 300 is controlled to allow the second valve member 310 to open or close the second outlet flow path 146, thereby selectively shutting off (regulating) the flow of the fluid or controlling the flow rate.

The second valve member 310 is connected to a lower end of the second plunger 300 and configured to open or close the second outlet flow path 146 in accordance with the movement of the second plunger 300.

For example, the second valve member 310 may be integrally connected to the lower end of the second plunger 300. When the second plunger 300 moves upward, the second valve member 310 moves upward together with the second plunger 300, such that the second outlet flow path 146 may be opened. In contrast, when the second plunger 300 moves downward, the second valve member 310 moves downward together with the second plunger 300, such that the second outlet flow path 146 may be blocked (closed).

The second valve member 310 may have various structures capable of opening or closing the second outlet flow path 146, and the present disclosure is not restricted or limited by the structure and the shape of the second valve member 310.

In particular, a second sealing member 312 (made of rubber or silicone, for example) is provided at a lower end of the second valve member 310 and configured to elastically come into close contact with the second outlet flow path 146. Since the second sealing member 312 is provided at the lower end of the second valve member 310 as described above, it is possible to obtain an advantageous effect of improving sealability implemented by the second valve member 310. When the second valve member 310 moves downward together with the second plunger 300 to be in contact with the second sealing member 312, the second outlet flow path 146 may be blocked (closed).

The second spring member 320 is provided to provide elastic force (SF2 FIG. 2) so that the second valve member 310 moves in the direction in which the second valve member 310 closes the second outlet flow path 146.

For example, a typical spring (e.g., a coil spring) capable of elastically supporting the movement of the second valve member 310 may be used as the second spring member 320, and the present disclosure is not restricted or limited by the type and the structure of the second spring member 320.

In particular, the second spring member 320 may be disposed between an inner side of one end of the first plunger 200 (e.g., an inner surface at an upper end of the first plunger 200) and an outer side at one end of the second plunger 300 (e.g., an outer surface at an upper end of the second plunger 300) so as to be elastically compressed and restored. Since the second spring member 320 is disposed between the inner surface at the upper end of the first plunger 200 and the outer surface at the upper end of the second plunger 300 as described above, it is possible to obtain an advantageous effect of simplifying the structure configured to support the second spring member 320 and improving spatial utilization.

Figure 6:
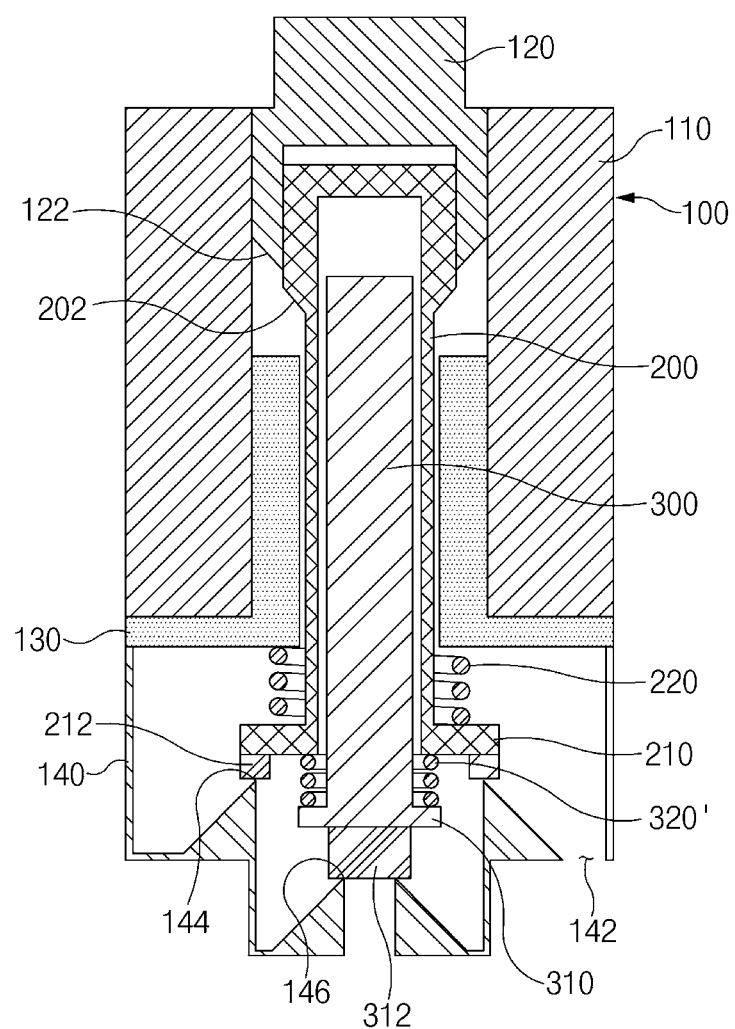
FIG. 6 is a view for explaining another example in which a second spring member is mounted in the solenoid valve according to the exemplary embodiment of the present disclosure.

According to another exemplary embodiment of the present disclosure, as illustrated in FIG. 6, a second spring member 320' may surround the second plunger 300 and may be disposed between the first valve member 210 and the second valve member 310 so as to be elastically compressed and restored. Since the second spring member 320' is disposed between the first valve member 210 and the second valve member 310 as described above, it is possible to obtain an advantageous effect of simplifying the structure configured to support the second spring member 320' and improving spatial utilization.

According to the exemplary embodiment of the present disclosure, a guide member 130 may be provided in the bobbin 110 so as to guide the upward and downward movements of the first plunger 200.

For example, the guide member 130 may be formed in a hollow cylindrical shape that surrounds the first plunger 200 and disposed between an inner circumferential surface of the bobbin 110 and an outer circumferential surface of the first plunger 200, thereby guiding the rectilinear movement of the first plunger 200. In particular, a lower end of the guide member 130 may extend to surround a bottom surface of the bobbin 110.

Since the guide member 130 is provided in the bobbin 110 as described above, it is possible to obtain an advantageous effect of minimizing the leftward and rightward movements and the deviation of the first plunger 200 when the first plunger 200 rectilinearly moves, and improving driving stability of the first plunger 200.

The timings of moving the first plunger 200 and the second plunger 300 by the solenoid 100 may be variously changed in accordance with required conditions and design specifications.

According to the exemplary embodiment of the present disclosure, the first plunger 200 and the second plunger 300 sequentially open or close the first outlet flow path 144 and the second outlet flow path 146 based on a pulse width modulation (PWM) duty rate of the solenoid 100.

For example, when the first plunger 200 moves upward first based on the duty rate of the solenoid 100, the first outlet flow path 144 may be opened first (before the second outlet flow path 146 is opened). Thereafter, when the second plunger 300 moves upward based on the duty rate of the solenoid 100, the second outlet flow path 146 may be subsequently opened (at a predetermined time interval from a point in time at which the first outlet flow path is opened).

In contrast, when the second plunger 300 moves downward based on the duty rate of the solenoid 100 in a state in which both the first outlet flow path 144 and the second outlet flow path 146 are opened, the second outlet flow path 146 may be closed first (before the first outlet flow path is closed). Thereafter, when the first plunger 200 moves downward based on the duty rate of the solenoid 100, the first outlet flow path 144 may be subsequently closed (at a predetermined time interval from a point in time at which the second outlet flow path is closed).

The timings of moving the first plunger 200 and the second plunger 300 may be variously changed based on the duty rate of the solenoid 100, and the present disclosure is not restricted or limited by the timings of moving the first plunger 200 and the second plunger 300 based on the duty rate of the solenoid 100.

For example, when the duty rate of the solenoid 100 is within a first range, the first valve member 210 may close the first outlet flow path 144, and the second valve member 310 may close the second outlet flow path 146. In contrast, when the duty rate of the solenoid 100 is within a second range larger than the first range, the first valve member 210 may open the first outlet flow path 144, and the second valve member 310 may close the second outlet flow path 146. In addition, when the duty rate of the solenoid 100 is within a third range larger than the second range, the second valve member 310 may open the second outlet flow path 146 in a state in which the first valve member 210 opens the first outlet flow path 144.

Figure 5:
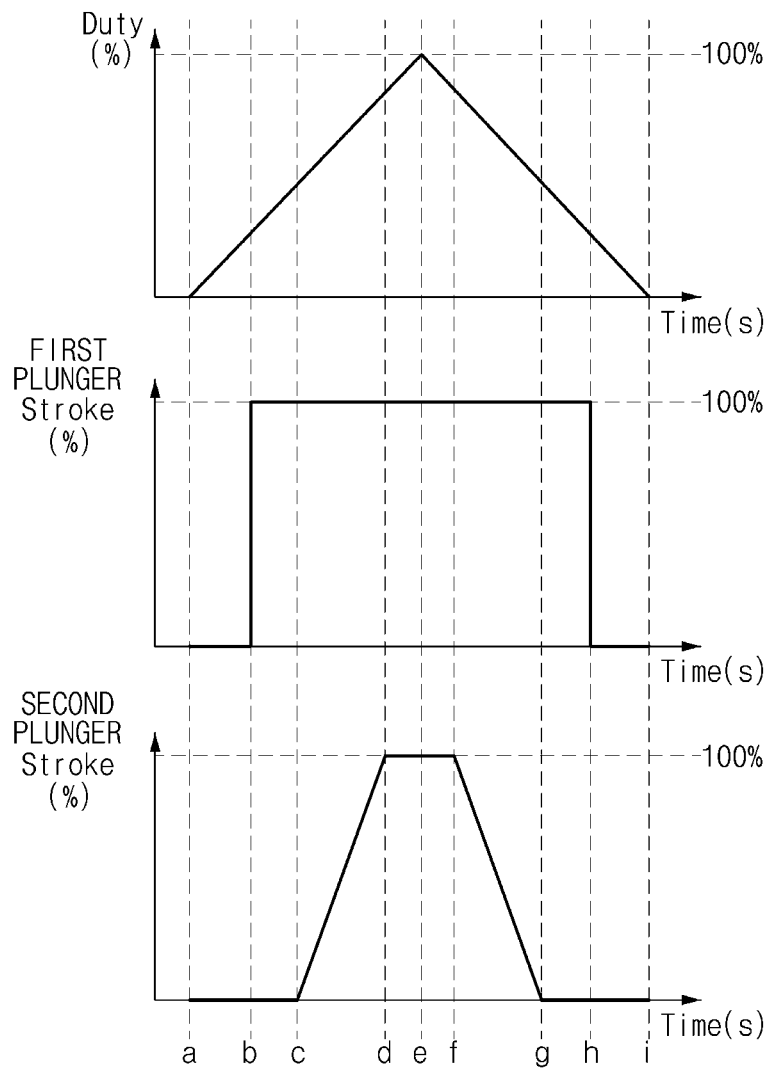
FIG. 5 is a view for explaining movement strokes of the first plunger and the second plunger in accordance with a duty rate of a solenoid in the solenoid valve according to the exemplary embodiment of the present disclosure.

For example, referring to FIG. 5, when a target duty rate of the solenoid 100 is 100%, the duty rate of the solenoid 100 may be increased linearly (periodically) from 0% to 100%. In particular, the first range may be included in a range of 0 to 19%, the second range may be included in a range of 20 to 39%, and the third range may be included in a range of 40 to 100%.

For reference, in FIG. 5, a point 'a' is a point at which the duty rate of the solenoid 100 is 0%, a point 'b' is a point at which the first plunger 200 begins to open the first outlet flow path 144, a point 'c' is a point at which the second plunger 300 begins to open the second outlet flow path 146, a section between points 'c' and 'd' is a section in which the duty rate related to the opening operation of the second plunger 300 (the opening operation of the second outlet flow path 146) is controlled, a point 'd' is a point at which the second plunger 300 begins to fully (maximally) open the second outlet flow path 146, a point 'e' is a point at which the duty rate of the solenoid 100 is 100%, a point 'f' is a point at which the second plunger 300 begins to close the second outlet flow path 146, a section between points 'f' and 'g' is a section in which the duty rate related to the closing operation of the second plunger 300 (the closing operation of the second outlet flow path 146) is controlled, a point 'g' is a point at which the second plunger 300 begins to fully (maximally) close the second outlet flow path 146, a point 'h' is a point at which the first plunger 200 begins to close the first outlet flow path 144, and a point 'i' is a point at which the duty rate of the solenoid 100 is 0%.

More specifically, when the duty rate of the solenoid 100 is within the first range (see the section between 'a' and 'b' in FIG. 5), the first valve member 210 may close the first outlet flow path 144, and the second valve member 310 may close the second outlet flow path 146. In this case, the closed state of the first outlet flow path 144 may be maintained by elastic force SF1 of the first spring member 220, and the closed state of the second outlet flow path 146 may be maintained by elastic force SF2 of the second spring member 320 (see FIG. 2).

Next, when the duty rate of the solenoid 100 is within the second range (see the section between 'b' and 'c' in FIG. 5), the state in which the second valve member 310 closes the second outlet flow path 146 is maintained, and the first valve member 210 opens the first outlet flow path 144 (see FIG. 3).

Figure 4:
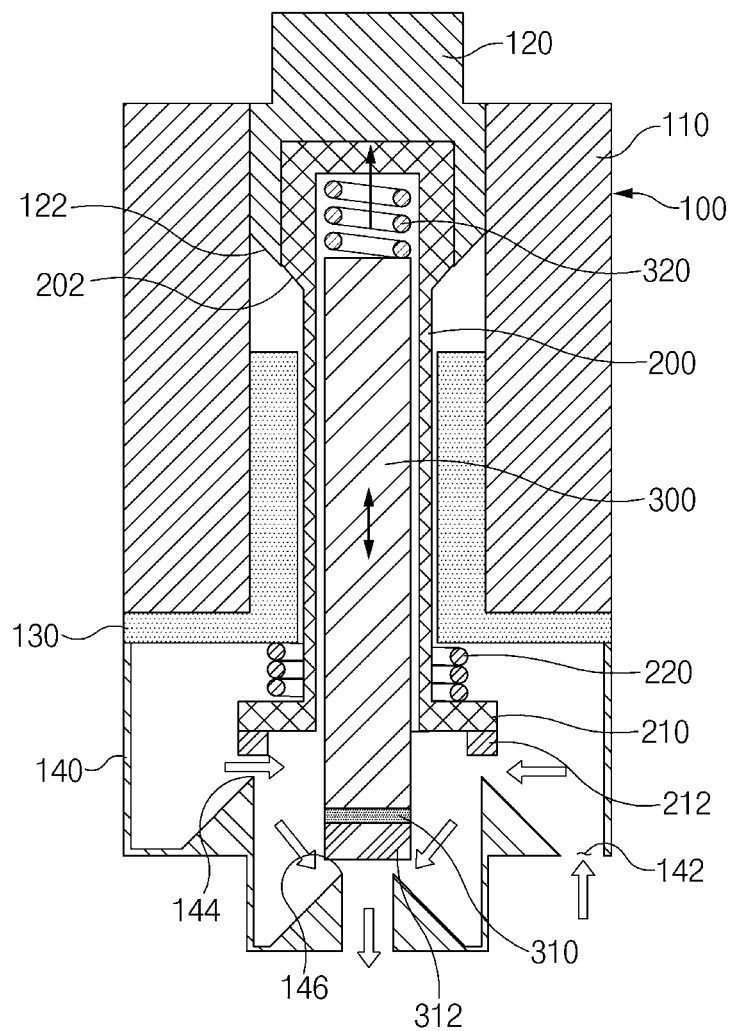

Next, when the duty rate of the solenoid 100 is within the third range (see the section between 'b' and 'd' in FIG. 5), the second valve member 310 opens the second outlet flow path 146 in the state in which the first valve member 210 opens the first outlet flow path 144 (see FIG. 4).

For reference, in the state in which the first valve member 210 opens the first outlet flow path 144, the first plunger 200 may be disposed to be in close contact with the yoke 120, and the second plunger 300 may open the second outlet flow path 146 while being rectilinearly moved by the magnetic field applied to the yoke 120 and the first plunger 200.

In addition, in the state in which the duty rate of the solenoid 100 is within the third range, the movement stroke of the second valve member 310 may be changed based on the duty rate (the second valve member may move in the up-down direction), and the flow rate of the fluid passing through the second outlet flow path 146 may be adjusted as the movement stroke of the second valve member 310 is changed (see FIG. 4).

In contrast, when the duty rate of the solenoid 100 becomes within the third range again (see the section between 'f' and 'g' in FIG. 5) from the state in which both the first outlet flow path 144 and the second outlet flow path 146 are fully opened (see the section between 'd' and 'f' in FIG. 5), the second valve member 310 closes the second outlet flow path 146 in the state in which the first valve member 210 opens the first outlet flow path 144.

Next, when the duty rate of the solenoid 100 becomes within the second range again (see the section between 'g' and 'h' in FIG. 5), the first valve member 210 closes the first outlet flow path 144 in the state in which the second valve member 310 closes the second outlet flow path 146.

Next, when the duty rate of the solenoid 100 becomes within the first range (see the section between 'h' and 'i' in FIG. 5), the closed state of the first outlet flow path 144 may be maintained by the elastic force SF1 of the first spring member 220, and the closed state of the second outlet flow path 146 may be maintained by the elastic force SF2 of the second spring member 320.

In particular, according to the exemplary embodiment of the present disclosure, the first outlet flow path 144 may be formed to have the first cross-sectional area (e.g., the first diameter), the second outlet flow path 146 may be formed to have the second cross-sectional area (e.g., the second diameter) smaller than the first cross-sectional area, and the movement stroke of the first plunger 200 may be defined to be smaller than the movement stroke of the second plunger 300.

In this case, the configuration in which the movement stroke of the first plunger 200 is defined to be smaller than the movement stroke of the second plunger 300 means that a distance of the upward and downward movements of the first plunger 200 is defined to be smaller than a distance of the upward and downward movements of the second plunger 300.

This configuration is derived from the fact that when the cross-sectional area (the first cross-sectional area) of the first outlet flow path 144 is larger than the cross-sectional area (the second cross-sectional area) of the second outlet flow path 146, the flow rate of the fluid flowing along the first outlet flow path 144 may be equal (or similar) to the flow rate of the fluid flowing along the second outlet flow path 146 even though the movement stroke of the first plunger 200 is not increased (e.g., even though the section in which the first plunger 200 moves upward is not increased to a certain degree or more). Therefore, it is possible to implement the configuration in which the movement stroke of the first plunger 200 is smaller than the movement stroke of the second plunger 300, and the first plunger 200 may be operated (to open or close the first outlet flow path) even though the duty rate of the solenoid 100 is relatively small (the duty rate is within the second range smaller than the third range).

According to the exemplary embodiment of the present disclosure as described above, the first plunger 200 and the second plunger 300 independently operate to close the first outlet flow path 144 and the second outlet flow path 146, such that a double shut-off structure may be formed. As a result, it is possible to obtain an advantageous effect of ensuring high sealability and improving stability and reliability.

Furthermore, according to the exemplary embodiment of the present disclosure, the first plunger 200 and the second plunger 300 may be independently operated only by the single solenoid 100 without individually providing a plurality of solenoids 100, and as a result, it is possible to obtain an advantageous effect of simplifying the structure, improving spatial utilization and a degree of design freedom, and reducing costs.

Moreover, according to the exemplary embodiment of the present disclosure, the first plunger 200 and the second plunger 300 may be sequentially operated based on the duty rate of the solenoid 100, such that the movements of the first plunger 200 and the second plunger 300 may be controlled by a single controller, and as a result, it is possible to more simplify the structure of the controller and the structure for connecting the controller.

In addition, according to the exemplary embodiment of the present disclosure, the first plunger 200 and the second plunger 300 may be independently operated, and as a result, it is possible to obtain an advantageous effect of maintaining sealability even though any one of the first plunger 200 and the second plunger 300 is abnormal (broken down).

According to the exemplary embodiment of the present disclosure, the yoke 120 has a first inclined recess 122, and the first plunger 200 has a second inclined recess 202 having a gradient corresponding to a gradient of the first inclined recess 122. When the first plunger 200 moves so that the first valve member 210 opens the first outlet flow path 144, the first inclined recess 122 and the second inclined recess 202 are disposed to form a straight line.

More specifically, the first inclined recess 122 having a predetermined gradient is formed at a lower end of the yoke 120 that surrounds a lateral surface of the first plunger 200, and the second inclined recess 202 having a gradient corresponding to the gradient of the first inclined recess 122 is formed on an outer surface at an upper end of the first plunger 200.

When the first plunger 200 moves so that the first valve member 210 opens the first outlet flow path 144 (when the first plunger moves upward to be in close contact with the yoke) in the state in which the first inclined recess 122 and the second inclined recess 202 are formed in the yoke 120 and the first plunger 200 as described above, the first inclined recess 122 and the second inclined recess 202 are disposed to form a straight line (disposed on the same plane), and as a result, it is possible to obtain an advantageous effect of further improving accuracy of proportional control of the second plunger 300.

In other words, since the first inclined recess 122 and the second inclined recess 202 are disposed on a straight line, the magnetic field applied to the yoke 120 and the first plunger 200 may be linearly increased or decreased in the up-down direction, such that the movement stroke of the second plunger 300 may be more accurately controlled, and as a result, it is possible to obtain an advantageous effect of further improving accuracy of proportional control of the second plunger 300.

As described above, according to the exemplary embodiment of the present disclosure, it is possible to obtain an advantageous effect of ensuring sealability and simplifying the structure.

In particular, according to the exemplary embodiment of the present disclosure, it is possible to obtain an advantageous effect of forming the double shut-off sealing structure by using the single solenoid.

In addition, according to the exemplary embodiment of the present disclosure, it is possible to obtain an advanta-geous effect of improving spatial utilization and a degree of design freedom and reducing costs.

In addition, according to the exemplary embodiment of the present disclosure, it is possible to obtain an advantageous effect of improving stability and reliability.

In addition, according to the exemplary embodiment of the present disclosure, it is possible to obtain an advantageous effect of improving accuracy of proportional control.

While the exemplary embodiments have been described above, but the exemplary embodiments are just illustrative and not intended to limit the present disclosure. It can be appreciated by those skilled in the art that various modifications and alterations, which are not described above, may be made to the present exemplary embodiment without departing from the intrinsic features of the present exemplary embodiment. For example, the respective constituent elements specifically described in the exemplary embodiments may be modified and then carried out. Further, it should be interpreted that the differences related to the modifications and alterations are included in the scope of the present disclosure defined by the appended claims.

What is claimed is:

1. A solenoid valve comprising:
   a valve housing;
   a solenoid provided at one side of the valve housing;
   a first plunger configured to be selectively moved rectilinearly by the solenoid;
   a first valve member connected to the first plunger and configured to selectively open or close a first outlet flow path in the valve housing in accordance with the movement of the first plunger;
   a first spring member configured to provide elastic force to move the first valve member in a direction in which the first valve member closes the first outlet flow path;
   a second plunger provided to be rectilinearly movable in the first plunger and configured to be selectively moved rectilinearly by the solenoid;
   a second valve member connected to the second plunger and configured to selectively open or close a second outlet flow path in the valve housing in accordance with the movement of the second plunger, the second outlet flow path being connected to a downstream side of the first outlet flow path; and
   a second spring member configured to provide elastic force to move the second valve member in a direction in which the second valve member closes the second outlet flow path,
   wherein the first plunger and the second plunger are configured to sequentially open or close the first outlet flow path and the second outlet flow path based on a duty rate of the solenoid,
   wherein when the duty rate of the solenoid is within a first range, the first valve member closes the first outlet flow path and the second valve member closes the second outlet flow path,
   wherein when the duty rate of the solenoid is within a second range larger than the first range, the first valve member opens the first outlet flow path and the second valve member closes the second outlet flow path, and
   wherein when the duty rate of the solenoid is within a third range larger than the second range, the second valve member opens the second outlet flow path in a state in which the first valve member opens the first outlet flow path.

2. The solenoid valve of claim 1, wherein the first outlet flow path is configured to have a first cross-sectional area, the second outlet flow path is configured to have a second cross-sectional area smaller than the first cross-sectional area and disposed in the second outlet flow path, and a movement stroke of the first plunger is defined to be smaller than a movement stroke of the second plunger.

3. The solenoid valve of claim 1, wherein the solenoid comprises:
   a bobbin around which a coil is wound; and
   a yoke provided in the bobbin so that one end of the first plunger is partially received in the yoke so as to be rectilinearly movable, and
   wherein the second plunger is selectively moved rectilinearly in the first plunger by a magnetic field applied to the yoke and the first plunger.

4. The solenoid valve of claim 3, wherein the second plunger is coaxially disposed in the first plunger.

5. The solenoid valve of claim 3, wherein the second spring member is interposed between an inner side at one end of the first plunger and an outer side at one end of the second plunger.

6. The solenoid valve of claim 3, comprising:
   a guide member provided in the bobbin and configured to guide the rectilinear movement of the first plunger.

7. The solenoid valve of claim 6, wherein the first spring member is interposed between the first valve member and the guide member.

8. The solenoid valve of claim 3, wherein the yoke has a first inclined recess, and the first plunger has a second inclined recess having a gradient corresponding to a gradient of the first inclined recess, and
   wherein when the first plunger moves so that the first valve member opens the first outlet flow path, the first inclined recess and the second inclined recess are configured to form a straight line.

9. The solenoid valve of claim 1, comprising:
   a first sealing member provided on the first valve member and configured to come into contact with the first outlet flow path.

10. The solenoid valve of claim 1, comprising:
    a second sealing member provided on the second valve member and configured to come into contact with the second outlet flow path.

11. The solenoid valve of claim 1, wherein the solenoid is an only solenoid in the solenoid valve.

* * * * *